(12) United States Patent
Iwasaki (10) Patent No.: US 9,548,075 B2
(45) Date of Patent: *Jan. 17, 2017

(54) MAGNETIC RECORDING MEDIUM AND MAGNETIC RECORDING/REPRODUCTION APPARATUS

(71) Applicant: KABUSHIKI KAISHA TOSHIBA, Tokyo (JP)

(72) Inventor: Takeshi Iwasaki, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 14/035,582

(22) Filed: Sep. 24, 2013

(65) Prior Publication Data

US 2015/0004436 A1    Jan. 1, 2015

(30) Foreign Application Priority Data

Jun. 27, 2013 (JP) .................................. 2013-135408

(51) Int. Cl.
*G11B 5/73* (2006.01)

(52) U.S. Cl.
CPC ............ *G11B 5/7325* (2013.01); *G11B 5/732* (2013.01); *Y10T 428/1164* (2015.01)

(58) Field of Classification Search
None
See application file for complete search history.

(56) References Cited

U.S. PATENT DOCUMENTS

| | | | |
|---|---|---|---|
| 5,645,898 A | 7/1997 | Sato et al. | |
| 6,682,826 B2 | 1/2004 | Shimizu et al. | |
| 6,815,098 B2 | 11/2004 | Matsunuma et al. | |
| 7,670,696 B2 | 3/2010 | Fullerton et al. | |
| 7,901,737 B2 | 3/2011 | Yasui et al. | |
| 7,993,765 B2 | 8/2011 | Kim et al. | |
| 2003/0091868 A1* | 5/2003 | Shimizu et al. | 428/694 TM |
| 2003/0170500 A1 | 9/2003 | Shimizu et al. | |
| 2004/0048092 A1 | 3/2004 | Yasui et al. | |

(Continued)

FOREIGN PATENT DOCUMENTS

| | | |
|---|---|---|
| JP | H03-012813 A | 1/1991 |
| JP | H07-192260 | 7/1995 |

(Continued)

OTHER PUBLICATIONS

U.S. Appl. No. 13/596,510, filed Aug. 28, 2012, Iwasaki.

(Continued)

*Primary Examiner* — Holly Rickman
*Assistant Examiner* — Lisa Chau
(74) *Attorney, Agent, or Firm* — Knobbe Martens Olson & Bear LLP (57) ABSTRACT

According to one embodiment, a perpendicular magnetic recording medium has an arrangement obtained by sequentially stacking a nonmagnetic substrate, a soft magnetic underlayer, a nonmagnetic seed layer containing silver grains having an fcc structure and an amorphous germanium grain boundary formed between the silver grains, a reaction barrier layer containing 90 at % or more of silver or aluminum and having a thickness of 2 nm or less, a nonmagnetic interlayer formed on the reaction barrier layer and made of ruthenium or a ruthenium alloy, and a perpendicular magnetic recording layer.

12 Claims, 4 Drawing Sheets

(56) References Cited

U.S. PATENT DOCUMENTS

| | | |
|---|---|---|
| 2004/0057157 A1 | 3/2004 | Shimizu et al. |
| 2004/0166376 A1 | 8/2004 | Kirino et al. |
| 2005/0214520 A1 | 9/2005 | Oikawa et al. |
| 2005/0214588 A1 | 9/2005 | Iwasaki et al. |
| 2006/0141292 A1* | 6/2006 | Iwasaki et al. ............... 428/831 |
| 2006/0280862 A1* | 12/2006 | Yasui et al. .................. 427/127 |
| 2009/0305080 A1 | 12/2009 | Li et al. |
| 2013/0250453 A1 | 9/2013 | Iwasaki |

FOREIGN PATENT DOCUMENTS

| | | |
|---|---|---|
| JP | 2527616 B | 8/1996 |
| JP | H09-134518 | 5/1997 |
| JP | 2002-025030 A | 1/2002 |
| JP | 2003-123245 A | 4/2003 |
| JP | 2004-95074 | 3/2004 |
| JP | 2006-185511 | 7/2006 |
| JP | 2007-018688 A | 1/2007 |
| JP | 2010-065312 A | 3/2010 |
| JP | 4642705 B | 3/2011 |
| JP | 2011-150783 | 8/2011 |
| JP | 2012-128912 A | 7/2012 |
| JP | 2013-125554 | 6/2013 |
| JP | 2013-196752 | 9/2013 |

OTHER PUBLICATIONS

Japanese Office Action for Patent Application 2012-066393, date May 20, 2014, 4 pages including translation.
Japanese Office Action dated Jul. 12, 2016 for JP Application No. 2013-135408 filed Jun. 27, 2013.

* cited by examiner

MAGNETIC RECORDING MEDIUM AND MAGNETIC RECORDING/REPRODUCTION APPARATUS

CROSS-REFERENCE TO RELATED APPLICATIONS

This application is based upon and claims the benefit of priority from Japanese Patent Application No. 2013-135408, filed Jun. 27, 2013, the entire contents of which are incorporated herein by reference.

FIELD

Embodiments described herein relate generally to a magnetic recording medium and magnetic recording/reproduction apparatus.

BACKGROUND

Magnetic recording devices (HDDs) mainly used in computers and capable of information recording and reproduction are used in various fields such as household video decks, audio apparatuses, and automobile navigation systems for reasons such as large capacities, low costs, high data access speeds, and high data retention reliability. As the use range of the HDDs expands, demands for increasing the storage capacity are increasing. Recently, therefore, the development of high-density HDDs is more and more extensively made.

A so-called perpendicular magnetic recording method is recently mainly used as a magnetic recording method for presently commercially available HDDs. In the perpendicular magnetic recording method, magnetic crystal grains forming a magnetic recording layer for recording information have the axis of easy magnetization in a direction perpendicular to a substrate. Accordingly, the influence of a demagnetizing field between recording bits is little even when the density is increased, and the medium is magnetostatically stable even at a high density. The perpendicular magnetic recording medium generally includes a substrate, a soft magnetic underlayer for concentrating a magnetic flux generated from a magnetic head during recording, a nonmagnetic seed layer and/or nonmagnetic underlayer for orienting magnetic crystal grains of a perpendicular magnetic recording layer in the (00.1) plane, and improving the crystalline orientation, the perpendicular magnetic recording layer containing a hard magnetic material, and a protective layer for protecting the surface of the perpendicular magnetic recording layer.

A granular type recording layer having a so-called granular structure in which magnetic crystal grains are surrounded by a grain boundary region made of a nonmagnetic substance has a structure in which the magnetic crystal grains are two-dimensionally physically isolated by the nonmagnetic grain boundary region. This reduces the magnetic exchange interaction acting between the magnetic grains. This makes it possible to reduce the transition noise in the recording/reproduction characteristics, and reduce the limit bit size. On the other hand, the exchange interaction between the grains is reduced in the granular type recording layer. This often increases the dispersion of a magnetic switching field, which is caused by the composition of the grain and the grain size distribution. As a consequence, the transition noise and jitter noise often increase in the recording/reproduction characteristics.

Also, the lower limit of the recording bit size strongly depends on the magnetic crystal grain size of the granular type recording layer. To increase the recording density of the HDD, therefore, it is necessary to decrease the grain size of the granular type recording layer. An example of the method of decreasing the grain size of the granular type recording layer, there is a method of forming an underlayer having a very small crystal grain size, thereby decreasing the grain size of the granular type recording layer stacked on the underlayer. To decrease the grain size of the underlayer, it is possible to improve a seed layer, granularize the underlayer, or the like.

DETAILED DESCRIPTION

In general, according to one embodiment, a perpendicular magnetic recording medium includes a nonmagnetic substrate, a soft magnetic underlayer formed on the nonmagnetic substrate, a nonmagnetic seed layer formed on the soft magnetic underlayer, and containing Ag grains having an fcc structure and an amorphous germanium grain boundary formed between the Ag grains, a nonmagnetic interlayer formed on the nonmagnetic seed layer, and made of Ru or an Ru alloy, and a perpendicular magnetic recording layer formed on the nonmagnetic interlayer, wherein a reaction barrier layer containing 90 at % or more of Ag or Al and having a thickness of 2 nm or less is further formed between the nonmagnetic seed layer and nonmagnetic interlayer, and this reaction barrier layer is directly formed on the nonmagnetic seed layer.

Also, according to one embodiment, a magnetic recording/reproduction apparatus includes the above-mentioned perpendicular magnetic recording medium, a mechanism configured to support and rotate the perpendicular magnetic recording medium, a magnetic head including an element configured to record information on the perpendicular magnetic recording medium, and an element configured to reproduce recorded information, and a carriage assembly configured to support the magnetic head such that the magnetic head freely moves with respect to the perpendicular magnetic recording medium.

For example, when a nonmagnetic seed layer made of an AgGe film having grain size distribution of 15% or less and a nonmagnetic interlayer made of Ru or an Ru alloy are brought into contact with each other, an Ru—Ge alloy is formed in the interface, and this often makes the traceability of the grain structure insufficient. In the embodiment, however, the reaction barrier layer that forms almost no Ge alloy on a binary phase diagram and contains 90 at % or more of Ag or Al is formed between the nonmagnetic seed layer and nonmagnetic interlayer so as to be brought into contact with the nonmagnetic seed layer. This suppresses the reaction between Ge and Ru, and makes it possible to sufficiently trace the grain structure of the nonmagnetic seed layer to the perpendicular magnetic recording layer. Consequently, the grain size distribution of the magnetic grains in the perpendicular magnetic recording layer reduces, so a perpendicular magnetic recording medium having good recording/reproduction characteristics can be provided.

If the thickness of the reaction barrier layer is large, the grain size increases, and the traceability of the grain structure of the nonmagnetic seed layer is canceled. Therefore, the thickness of the reaction barrier layer used in the embodiment can be set to 2 nm or less, and furthermore, 1 nm or less.

To emphasize the grain boundary of the reaction barrier layer, the reaction barrier layer can contain less than 10 at % (mol %) of an additive. As this additive, it is possible to use at least one material selected from carbon, silicon dioxide, copper, and neodymium.

A granular structure can be formed by adding C or $SiO_2$ to the reaction barrier layer. Cu or Nd can also be added to the reaction barrier layer in order to surround Ag grains or Al grains of the reaction barrier layer with a Ge reaction product by forming an alloy with Ge of the nonmagnetic seed layer. If the content of the additive is large, the crystal orientation of the Ag grains or Al grains deteriorates. Therefore, it is possible to set the mixing amount of the additive to less than 10 at % (or mol %), and furthermore, less than 5 at % (or mol %), i.e., set the content of Ag or Al to 95 at % or more.

Ag can be used as a metal for use in the reaction barrier layer.

The Ge composition amount contained in the AgGe nonmagnetic seed layer can be set at 55 at % (inclusive) to 70 at % (inclusive).

If the Ge composition amount is less than 55 at %, the amount of Ge as a grain boundary formation substance is too small, and the Ag grains often connect to each other. If the Ge composition amount exceeds 70 at %, the amount of Ge as a grain boundary formation substance is too large, and the film often becomes amorphous.

Examples of the substrate usable in the embodiment are a glass substrate, an Al-based alloy substrate, a ceramic substrate, a carbon substrate, and an Si single-crystal substrate having an oxidized surface. Examples of the glass substrate are amorphous glass and crystallized glass. Examples of the amorphous glass are general-purpose, soda-lime glass and aluminosilicate glass. An example of the crystallized glass is lithium-based crystallized glass. Examples of the ceramic substrate are general-purpose sintered products mainly containing aluminum oxide, aluminum nitride, and silicon nitride, and their fiber reinforced products. As the substrate, it is also possible to use a substrate obtained by forming a thin film such as an NiP layer by plating or sputtering on the surface of the metal substrate or nonmetal substrate described above. The method of forming the thin film on the substrate is not limited to sputtering, and the same effect can be obtained by using vacuum deposition or electroplating.

It is possible to further form an adhesive layer, soft magnetic underlayer, or nonmagnetic underlayer between the nonmagnetic substrate and magnetic recording layer.

The adhesive layer is formed to improve the adhesion to the substrate. As the material of the adhesive layer, it is possible to use a material having an amorphous structure such as Ti, Ta, W, Cr, or Pt, or an alloy, oxide, or nitride of any of these elements.

The adhesive layer can have a thickness of, e.g., 5 to 30 nm.

If the thickness is less than 5 nm, it is impossible to ensure sufficient adhesion, and film peeling readily occurs. If the thickness exceeds 30 nm, the process time prolongs, and the throughput tends to worsen.

The soft magnetic underlayer horizontally passes a recording magnetic field from a single-pole head for magnetizing the perpendicular magnetic recording layer, and returns the magnetic field toward the magnetic head, i.e., performs a part of the function of the magnetic head. The soft magnetic underlayer has a function of applying a steep sufficient perpendicular magnetic field to the magnetic field recording layer, thereby increasing the recording/reproduction efficiency. A material containing Co, Fe, or Ni can be used as the soft magnetic underlayer. Examples of the material are Co alloys containing Co and at least one of Zr, Hf, Nb, Ta, Ti, and Y. The Co alloy can contain 80 at % or more of Co. When the Co alloy like this is deposited by sputtering, an amorphous layer readily forms. The amorphous soft magnetic material has none of magnetocrystalline anisotropy, a crystal defect, and a grain boundary, and hence has very high soft magnetism and can reduce the noise of the medium. Examples of the amorphous soft magnetic material are CoZr-, CoZrNb-, and CoZrTa-based alloys. Other examples of the soft magnetic underlayer material are CoFe-based alloys such as CoFe and CoFeV, FeNi-based alloys such as FeNi, FeNiMo, FeNiCr, and FeNiSi, FeAl-based and FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN. It is also possible to use a material having a microcrystalline structure or a granular structure in which fine crystal grains are dispersed in a matrix. Examples are FeAlO, FeMgO, FeTaN, and FeZrN containing 60 at % or more of Fe.

The soft magnetic underlayer can have a thickness of, e.g., 10 to 100 nm.

If the thickness is less than 10 nm, it is often impossible to sufficiently receive a recording magnetic field from a magnetic head, and increase the recording/reproduction efficiency. If the thickness exceeds 100 nm, the process time prolongs, and the throughput tends to worsen.

Furthermore, in order to prevent spike noise, it is possible to divide the soft magnetic underlayer into a plurality of layers, and insert a 0.5- to 1.5-nm thick nonmagnetic dividing layer, thereby causing antiferromagnetic coupling. In this case, it is possible to use, e.g., Ru, an Ru alloy, Pd, Cu, or Pt. The soft magnetic underlayer may also be exchange-coupled with a hard magnetic film having in-plane anisotropy such as CoCrPt, SmCo, or FePt, or a pinned layer made of an antiferromagnetic material such as IrMn or PtMn. To control the exchange coupling force, it is possible to stack magnetic films such as Co or nonmagnetic films such as Pt on the upper and lower surfaces of the nonmagnetic dividing layer.

The magnetic recording layer usable in the embodiment can mainly contain platinum and one element selected from iron and cobalt. Also, it is desirable to use a perpendicular magnetic recording layer having magnetic anisotropy perpendicular to the substrate. When increasing the density by using the perpendicular magnetic recording layer, an external magnetic field generated from a recording dot acts in a direction to hold signals of surrounding recording dots. This makes signals difficult to erase by thermal decay, and facilitates increasing the density.

The thickness of the magnetic recording layer can be set at 3 to 30 nm, and furthermore, 5 to 15 nm. When the thickness falls within this range, it is possible to manufacture a magnetic recording/reproduction apparatus for a high recording density. If the thickness of the magnetic recording layer is less than 3 nm, the reproduced output is too low, and the noise component becomes higher. If the thickness of the magnetic recording layer exceeds 30 nm, the reproduced output becomes too high and distorts the waveform. The magnetic recording layer can also be a multilayered film including two or more layers. In this case, the total thickness of the stacked layers can be set within the above-described range. The coercive force of the magnetic recording layer can be set to 237,000 A/m (3,000 Oe) or more. If the coercive force is less than 237,000 A/m (3,000 Oe), the thermal decay resistance decreases. The perpendicular squareness ratio of the magnetic recording layer can be set at 0.8 or more. If the perpendicular squareness ratio is less than 0.8, the thermal decay resistance decreases.

In the granular type recording layer using Co, the Pt content of the magnetic recording layer can be set at 10 at % (inclusive) to 25 at % (inclusive). When the Pt content falls within the above range, a uniaxial magnetocrystalline anisotropy constant (Ku) necessary for the magnetic recording layer is obtained, and the crystal orientation of the magnetic grains improves. Consequently, thermal decay characteristics and recording/reproduction characteristics suited to high-density recording are obtained. If the Pt content exceeds or is less than the above-mentioned range, it is often impossible to obtain a sufficient Ku necessary for thermal decay characteristics suited to high-density recording.

The protective film usable in the embodiment is formed to prevent the corrosion of the magnetic recording layer, and prevent damages to the medium surface when a magnetic head comes in contact with the medium. An example of the material of the protective film is a material containing C. The thickness of the protective film can be set at 1 to 10 nm. This thickness makes high-density recording feasible because the distance between the head and medium can be decreased. Carbon can be classified into $sp^2$-bonded carbon (graphite) and $sp^3$-bonded carbon (diamond). $Sp^3$-bonded carbon is superior in durability and corrosion resistance, but inferior to graphite in surface smoothness because diamond is crystalline. A carbon film is normally formed by sputtering using a graphite target. This method forms amorphous carbon containing both $sp^2$-bonded carbon and $sp^3$-bonded carbon. Amorphous carbon having a high $sp^3$-bonded carbon ratio is called DLC (Diamond-Like Carbon). DLC is superior in durability and corrosion resistance, and also superior in surface smoothness because it is amorphous. Therefore, DLC can be used as a surface protective film of a magnetic recording medium. In the deposition of DLC performed by chemical vapor deposition (CVD), DLC is generated by a chemical reaction by exciting and decomposing a source gas in plasma. Therefore, it is possible to form DLC rich in $sp^3$-bonded carbon by matching the conditions.

Figure 7:
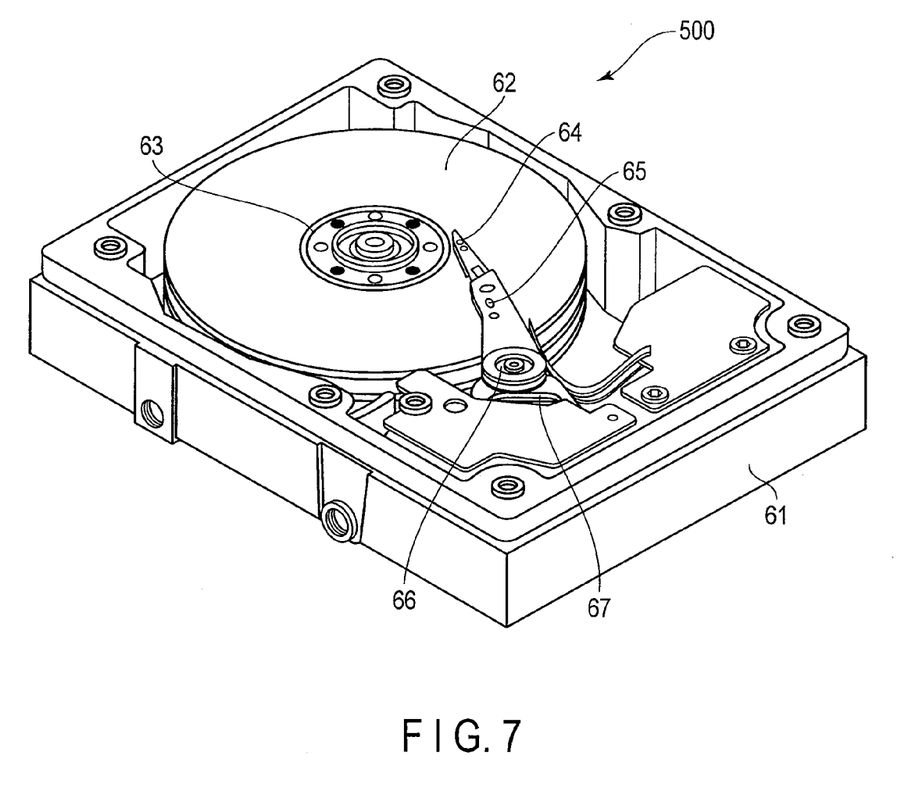
FIG. 7 is a sectional view schematically showing an example of a magnetic recording/reproduction apparatus according to an embodiment.

FIG. 7 is a partially exploded perspective view showing an example of the magnetic recording/reproduction apparatus according to the embodiment.

In a magnetic recording/reproduction apparatus 500 according to the embodiment, a rigid magnetic disk 62 for recording information according to the embodiment is fitted on a spindle 63, and rotated at a predetermined rotational speed by a spindle motor (not shown). A slider 64, on which the magnetic head according to an embodiment which accesses the magnetic disk 62 and records and reproduces information is mounted, is attached to the distal end of a suspension 65 made of a thin leaf spring. The suspension 65 is connected to one end of an arm 66 including a bobbin for holding a driving coil (not shown).

A voice coil motor 67 as a kind of a linear motor is formed at the other end of the arm 66. The voice coil motor 67 includes the driving coil (not shown) wound on the bobbin of the arm 66, and a magnetic circuit including a permanent magnetic and counter yoke facing each other so as to sandwich the driving coil between them.

The arm 66 is held by ball bearings (not shown) formed in upper and lower portions of a fixed shaft, and rotatably swung by the voice coil motor 67. That is, the voice coil motor 67 controls the position of the slider 64 on the magnetic disk 62. Note that reference numeral 61 in FIG. 7 denotes a housing.

Embodiments will be explained below with reference to the accompanying drawings.

Example 1 & Comparative Example 1

Figure 1:
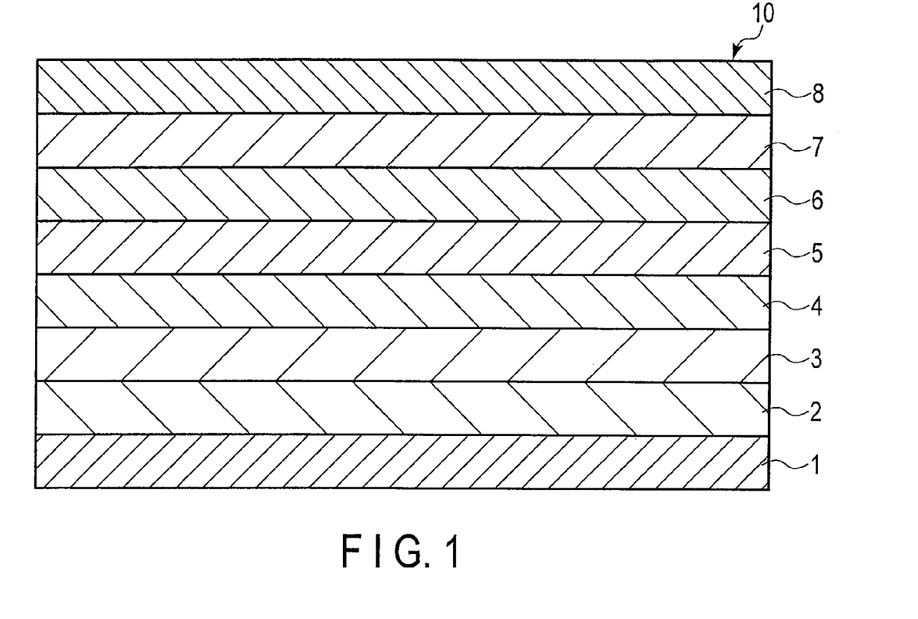
FIG. 1 is a sectional view schematically showing an example of a magnetic recording medium according to an embodiment.

FIG. 1 is a schematic sectional view showing a perpendicular magnetic recording medium according to Example 1

A nonmagnetic glass substrate 1 (amorphous substrate MEL6 manufactured by KONICA MINOLTA, diameter=2.5 inches) was placed in a deposition chamber of a DC magnetron sputtering instrument (C–3010 manufactured by CANON ANELVA), and the deposition chamber was evacuated to an ultimate vacuum degree of $1 \times 10^{-5}$ Pa. 10-nm thick Cr-25 at % Ti was formed as an adhesive layer 2 on the substrate 1 at DC 500 W by supplying Ar gas into the deposition chamber so that the gas pressure was 0.7 Pa.

Then, 40-nm thick Co-20 at % Fe-7 at % Ta-5 at % Zr was formed as a soft magnetic underlayer 3 at an Ar pressure of 0.7 Pa and DC 500 W.

In addition, a 5-nm thick Ag-60 at % Ge film was formed as a nonmagnetic seed layer 4 at an Ar pressure of 0.1 Pa and RF 100 W.

After that, 1-nm thick Ag-5 at % C was formed as a reaction barrier layer 5 at an Ar pressure of 0.7 Pa and DC 500 W.

Subsequently, as a nonmagnetic interlayer 6, 8-nm thick Ru was formed at an Ar pressure of 0.7 Pa and DC 500 W, and 8-nm thick Ru was formed again by changing the Ar pressure to 6.0 Pa.

Furthermore, 12-nm thick Co-18 at % Pt-14 at % Cr-10 mol % $SiO_2$ was formed as a perpendicular magnetic recording layer 7 at an Ar pressure of 0.7 Pa and DC 500 W.

Then, a 2.5-nm thick DLC protective layer 8 was formed by CVD.

After that, a perpendicular magnetic recording medium 10 according to the embodiment was obtained by coating the medium with a lubricant (not shown) by dipping.

The obtained perpendicular magnetic recording medium had a structure in which the nonmagnetic glass substrate 1/CrTi adhesive layer 2/CoFeTaZr soft magnetic underlayer 3/nonmagnetic seed layer 4/reaction barrier layer 5/nonmagnetic interlayer 6/CoCrPt—$SiO_2$ perpendicular magnetic recording layer 7/DLC protective layer 8 were stacked in this order.

FIGS. 2, 3, 4, 5, and 6 are sectional views schematically showing examples of a comparative magnetic recording medium.

Figure 2:
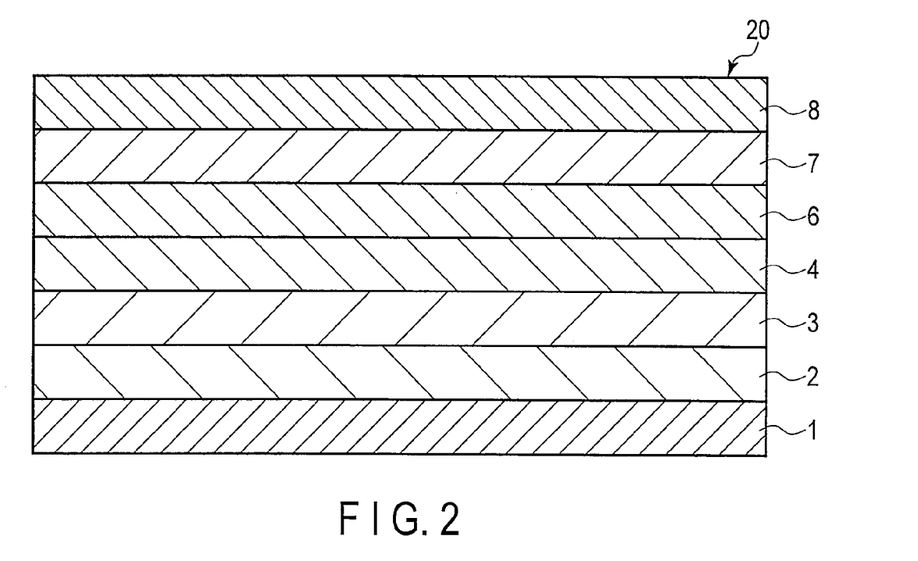
FIG. 2 is a sectional view schematically showing an example of a comparative magnetic recording medium.

As shown in FIG. 2, a perpendicular magnetic recording medium 20 according to Comparative Example 1 was obtained following the same procedures as in Example 1, except that no reaction barrier layer 5 was formed.

The obtained perpendicular magnetic recording medium had a structure in which a nonmagnetic glass substrate 1/CrTi adhesive layer 2/CoFeTaZr soft magnetic underlayer 3/nonmagnetic seed layer 4/Ru nonmagnetic interlayer 6/CoCrPt—SiO$_2$ perpendicular magnetic recording layer 7/DLC protective layer 8 were stacked in this order.

Comparative Examples 2 & 3

Figure 3:
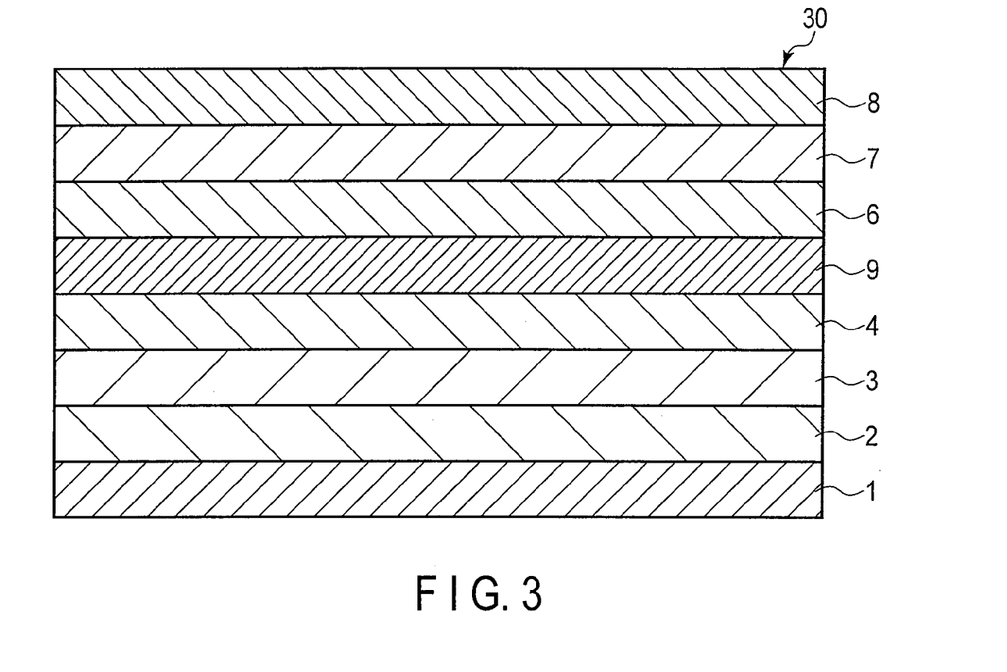
FIG. 3 is a sectional view schematically showing another example of the comparative magnetic recording medium.

As shown in FIG. 3, a perpendicular magnetic recording medium 30 according to Comparative Example 2 was obtained following the same procedures as in Example 1, except that no reaction barrier layer 5 was formed, and a 5-nm thick Pd nonmagnetic underlayer 9 was formed between a nonmagnetic seed layer 4 and nonmagnetic interlayer 6 at an Ar pressure of 0.7 Pa and DC 500 W.

Also, a perpendicular magnetic recording medium according to Comparative Example 3 was obtained following the same procedures as in Comparative Example 2, except that 5-nm thick NiW was formed instead of Pd at an Ar pressure of 0.7 Pa.

The obtained perpendicular magnetic recording media had a structure in which a nonmagnetic glass substrate 1/CrTi adhesive layer 2/CoFeTaZr soft magnetic underlayer 3/nonmagnetic seed layer 4/nonmagnetic underlayer 9/nonmagnetic interlayer 6/CoCrPt—SiO$_2$ perpendicular magnetic recording layer 7/DLC protective layer 8 were stacked in this order.

Comparative Example 4

Figure 4:
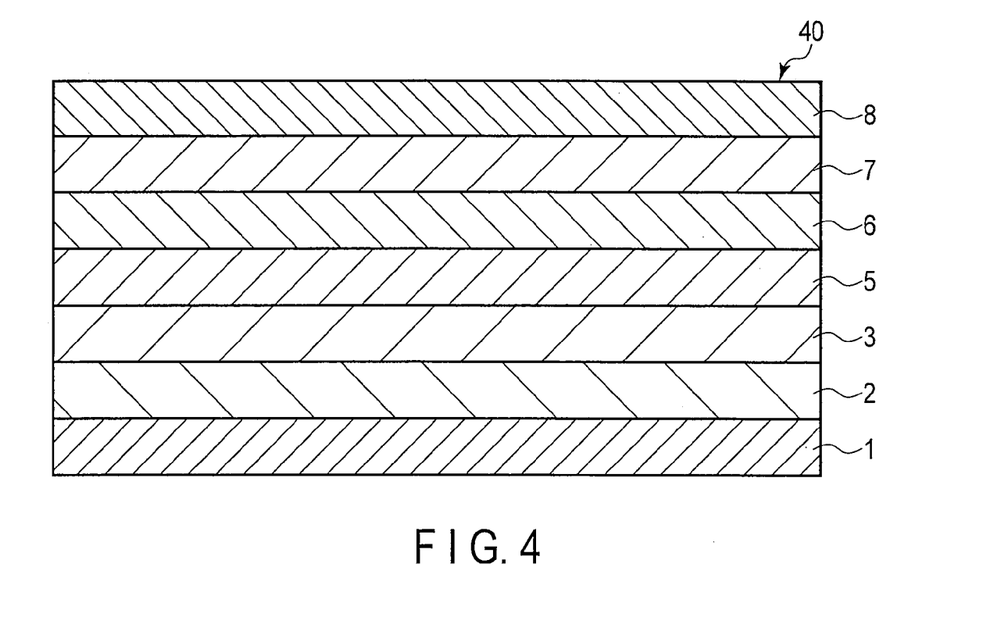
FIG. 4 is a sectional view schematically showing still another example of the comparative magnetic recording medium.

As shown in FIG. 4, a perpendicular magnetic recording medium 40 according to Comparative Example 4 was manufactured following the same procedures as for the medium of Example 1, except that no nonmagnetic seed layer 4 was formed.

The obtained perpendicular magnetic recording medium had a structure in which a nonmagnetic glass substrate 1/CrTi adhesive layer 2/CoFeTaZr soft magnetic underlayer 3/reaction barrier layer 5/Ru nonmagnetic interlayer 6/CoCrPt—SiO$_2$ perpendicular magnetic recording layer 7/DLC protective layer 8 were stacked in this order.

Comparative Example 5

Figure 5:
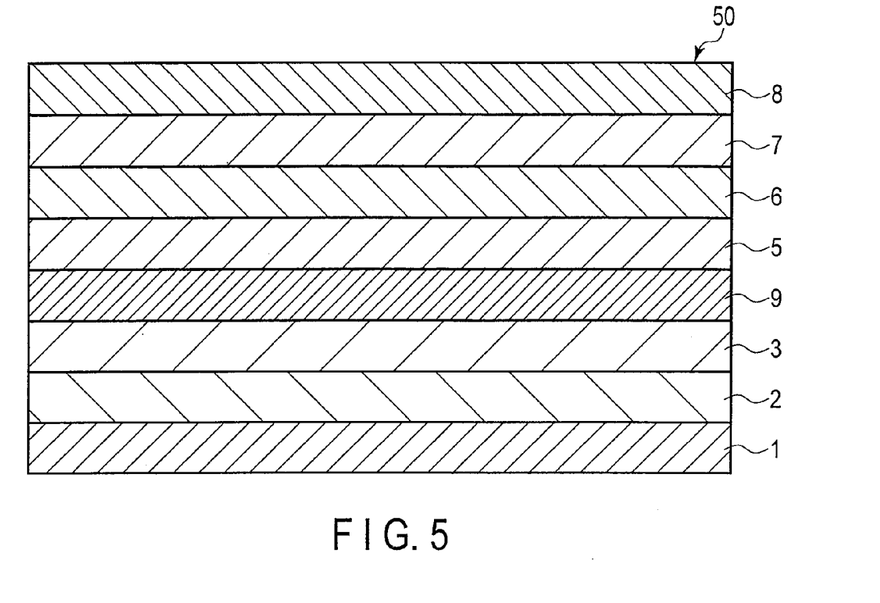
FIG. 5 is a sectional view schematically showing still another example of the comparative magnetic recording medium.

As shown in FIG. 5, a perpendicular magnetic recording medium 50 was obtained following the same procedures as for the medium of Example 1, except that no nonmagnetic seed layer 4 was formed, and a 5-nm thick Pd nonmagnetic underlayer 9 was formed between a soft magnetic underlayer 3 and nonmagnetic interlayer 6 at an Ar pressure of 0.7 Pa and DC 500 W.

The obtained perpendicular magnetic recording medium had a structure in which a nonmagnetic glass substrate 1/CrTi adhesive layer 2/CoFeTaZr soft magnetic underlayer 3/nonmagnetic underlayer 9/reaction barrier layer 5/nonmagnetic interlayer 6/CoCrPt—SiO$_2$ perpendicular magnetic recording layer 7/DLC protective layer 8 were stacked in this order.

Comparative Example 6

Also, a perpendicular magnetic recording medium according to Comparative Example 6 was obtained following the same procedures as for the medium of Comparative Example 5, except that 5-nm thick NiW was formed instead of Pd as a nonmagnetic underlayer 9 at an Ar pressure of 0.7 Pa.

As in Comparative Example 5, the obtained perpendicular magnetic recording medium had a structure in which a nonmagnetic glass substrate 1/CrTi adhesive layer 2/CoFeTaZr soft magnetic underlayer 3/nonmagnetic underlayer 9/reaction barrier layer 5/nonmagnetic interlayer 6/CoCrPt—SiO$_2$ perpendicular magnetic recording layer 7/DLC protective layer 8 were stacked in this order.

Comparative Example 7

Figure 6:
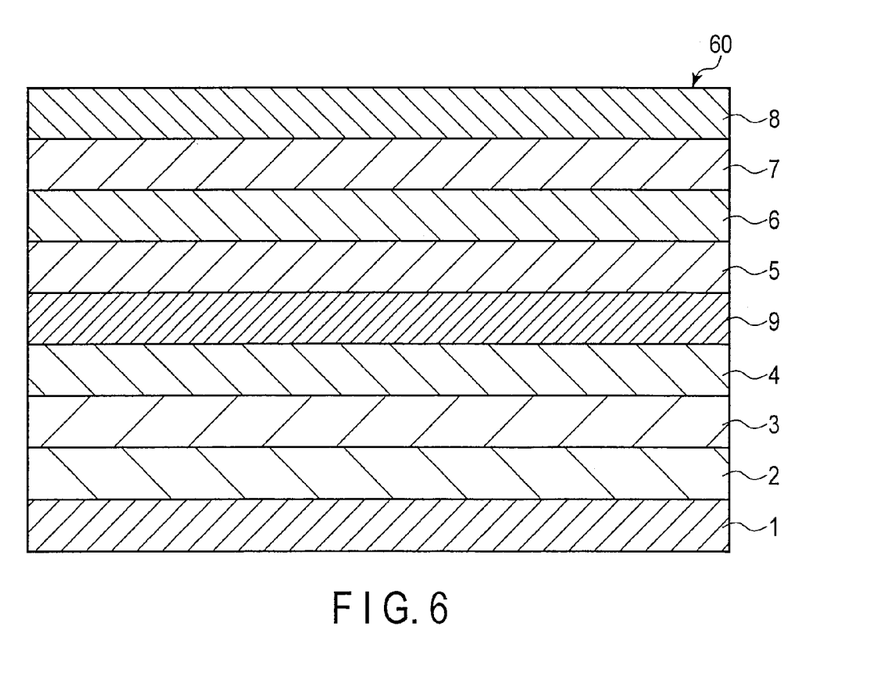
FIG. 6 is a sectional view schematically showing still another example of the comparative magnetic recording medium.

As shown in FIG. 6, a perpendicular magnetic recording medium 60 according to Comparative Example 7 was obtained following the same procedures as for the medium of Example 1, except that a 5-nm thick Pd nonmagnetic underlayer 9 was formed between a nonmagnetic seed layer 4 and reaction barrier layer 5 at an Ar pressure of 0.7 Pa and DC 500 W.

The obtained perpendicular magnetic recording medium had a structure in which a nonmagnetic glass substrate 1/CrTi adhesive layer 2/CoFeTaZr soft magnetic underlayer 3/nonmagnetic seed layer 4/nonmagnetic underlayer 9/reaction barrier layer 5/nonmagnetic interlayer 6/CoCrPt—SiO$_2$ perpendicular magnetic recording layer 7/DLC protective layer 8 were stacked in this order.

Comparative Example 8

A perpendicular magnetic recording medium 60 according to Comparative Example 8 was obtained following the same procedures as for the medium of Comparative Example 7, except that 5-nm thick NiW was formed instead of Pd as a nonmagnetic underlayer 9 at an Ar pressure of 0.7 Pa.

As in Comparative Example 7, the obtained perpendicular magnetic recording medium had a structure in which a nonmagnetic glass substrate 1/CrTi adhesive layer 2/CoFeTaZr soft magnetic underlayer 3/nonmagnetic seed layer 4/nonmagnetic underlayer 9/reaction barrier layer 5/nonmagnetic interlayer 6/CoCrPt—SiO$_2$ perpendicular magnetic recording layer 7/DLC protective layer 8 were stacked in this order.

The obtained perpendicular magnetic recording media according to Example 1 and Comparative Examples 1 to 8 were measured and evaluated as follows.

First, the grain structure in the sectional direction was observed by using a cross-sectional transmission electron microscope (TEM). Then, composition analysis was performed by using energy dispersive X-ray spectroscopy (TEM-EDX).

Consequently, in the AgGe nonmagnetic seed layer of the medium of Example 1, the Ag grains had a grain size of about 4 nm, and the Ge grain boundary had a thickness of about 2 nm. In addition, the Ag grains of the AgGe nonmagnetic seed layer extended into the shape of a pillar in the direction perpendicular to the substrate, and epitaxially grew to the Ru grains of the nonmagnetic interlayer and the CoCrPt grains of the perpendicular magnetic recording layer via the AgC reaction barrier layer. That is, the Ag grains of the nonmagnetic seed layer, the Ru grains of the nonmagnetic interlayer, and the CoCrPt grains of the perpendicular magnetic recording layer grew by one-to-one growth.

On the other hand, in Comparative Example 1, an amorphous layer about 1 to 2 nm thick was observed near the interface between the AgGe nonmagnetic seed layer and Ru nonmagnetic interlayer. When this amorphous layer was observed by TEM-EDX, Ag and Ge of the nonmagnetic seed layer and Ru of the nonmagnetic interlayer were observed, but the Ge and Ru components were strongly observed, so the possibility that an Ru—Ge alloy phase (reaction layer) was formed was high. That is, in the medium of Comparative Example 1, this amorphous layer partially obstructed the traceability of the grain structure from the AgGe nonmagnetic seed layer to the Ru nonmagnetic interlayer. Consequently, the positions of the Ru grains in the nonmagnetic interlayer did not correspond to those of the Ag grains in the nonmagnetic seed layer, so the Ag grains and the Ru grains did not grow by one-to-one growth.

Likewise, in the media of Comparative Examples 2 and 3, an amorphous reaction layer about 3 nm thick was observed in the interface between the nonmagnetic seed layer and nonmagnetic underlayer (Pd or NiW). When this amorphous layer was analyzed by TEM-EDX, Ag and Ge of the nonmagnetic seed layer and Pd (or Ni and W) of the nonmagnetic underlayer were observed; but the Ge and Pd components (or Ni and W components) were strongly observed, so an alloy phase (reaction layer) containing Pd (or Ni and W) and Ge was probably formed. Consequently, this amorphous layer obstructed the one-to-one growth from the Ag grains in the nonmagnetic seed layer to the Ru grains in the nonmagnetic interlayer, so the traceability was insufficient.

In the medium of Comparative Example 4, the structure of the AgC reaction barrier layer was observed as an amorphous structure. In the medium of Comparative Example 4, the AgC reaction barrier layer was formed to have a small thickness of 1 nm on the soft magnetic underlayer, and amorphousized because the soft magnetic underlayer had an amorphous structure and had no grain structure.

In the media of Comparative Examples 5 and 6, Pd or NiW as the nonmagnetic underlayer formed crystalline grains having a grain size of about 8 to 12 nm. The grain structure was traced to the Ru nonmagnetic interlayer and CoCrPt—SiO$_2$ perpendicular magnetic recording layer via the AgC reaction barrier layer, but the original grain size was as large as 8 to 12 nm. No amorphous reaction layer was observed between the nonmagnetic underlayer and reaction barrier layer, and between the reaction barrier layer and nonmagnetic interlayer. Finally, in the media of Comparative Examples 7 and 8, a reaction layer about 3 nm thick was observed in the interface between the AgGe nonmagnetic seed layer and Pd or NiW of the nonmagnetic underlayer. This was so presumably because the nonmagnetic seed layer and reaction barrier layer were not in contact with each other, so it was impossible to suppress the formation of the reaction layer. Consequently, the one-to-one growth from the nonmagnetic seed layer to the Ru grains of the nonmagnetic interlayer was obstructed, so the traceability was insufficient.

Next, plane-view TEM analysis was performed on the medium of Example 1 and the media of Comparative Examples 1 to 8.

In the medium of Example 1 and the media of Comparative Examples 1 to 3, 7, and 8, the AgGe film as the nonmagnetic seed layer contained crystalline Ag grains having a grain size of about 4 nm and an amorphous Ge grain boundary having a grain boundary width of about 2 nm. The grain size distribution was about 13%, i.e., narrow grain size distribution. Note that the grain size distribution was measured by analyzing a plane-view TEM image by using a computer.

On the other hand, in the nonmagnetic underlayer of each of the media of Comparative Examples 5 and 6, the crystal grains were made of Pd or NiW, had a grain size of about 8 to 12 nm, and were in contact with each other, i.e., the grain boundary width was practically 0. The grain size distribution in the nonmagnetic seed layer was 23% to 24%, i.e., did not improve. The perpendicular magnetic recording layers of the medium of Example 1 and the media of Comparative Examples 1 to 8 were as follows. In the medium of Example 1, the grain size distribution of the grains in the perpendicular magnetic recording layer was about 13% to 14%, i.e., narrow grain size distribution. On the other hand, the grain size distribution of the grains in the perpendicular magnetic recording layer of the medium of Comparative Example 1 was about 20%. In the perpendicular magnetic recording layer of each of the media of Comparative Examples 2 to 8, the grain size distribution was about 22% to 25%, i.e., there was no improving effect.

Subsequently, the recording/reproduction characteristics of these media were evaluated. The evaluation of the recording/reproduction characteristics was performed by using read-write analyzer RWA1632 and spinstand S1701MP manufactured by GUZIK, U.S.A. The recording/reproduction characteristics were measured by using a head including a shielded magnetic pole as a single magnetic pole having a shield (a shield has a function of converging a magnetic flux generated from a magnetic head) for write, and a TMR element as a reproduction unit, and by setting the recording frequency at a linear recording density of 2,500 kBPI. Table 1 shows the results.

The medium according to Example 1 had a value of 22.6 dB, i.e., a good recording/reproduction characteristic. As shown in Table 1, the medium of Example 1 had a recording/reproduction characteristic better than those of the media of Comparative Examples 1 to 8.

TABLE 1

| | Nonmagnetic seed layer Material | Nonmagnetic underlayer Material | Reaction barrier layer Material | SNR (dB) |
|---|---|---|---|---|
| Example 1 | AgGe | — | Ag—5 at % C | 22.6 |
| Comparative Example 1 | AgGe | — | — | 19.2 |
| Comparative Example 2 | AgGe | Pd | — | 16.8 |
| Comparative Example 3 | AgGe | NiW | — | 17.7 |
| Comparative Example 4 | — | — | Ag—5 at % C | 9.4 |
| Comparative Example 5 | — | Pd | Ag—5 at % C | 13.4 |
| Comparative Example 6 | — | NiW | Ag—5 at % C | 14.1 |
| Comparative Example 7 | AgGe | Pd | Ag—5 at % C | 15.2 |
| Comparative Example 8 | AgGe | NiW | Ag—5 at % C | 16.5 |

Since the Ag—C reaction barrier layer was formed in contact with the AgGe nonmagnetic seed layer, the AgC reaction barrier layer was able to suppress a reaction layer generated between the AgGe nonmagnetic seed layer and Ru nonmagnetic interlayer. This AgC reaction barrier layer improved the probability of one-to-one growth from the Ag grains in the AgGe nonmagnetic seed layer having narrow grain size distribution to the Ru grains in the nonmagnetic interlayer. This made it possible to more accurately trace the grain structure of the AgGe nonmagnetic seed layer having narrow grain size distribution to the CoCrPt—SiO$_2$ perpendicular magnetic recording layer. As a consequence, the transition noise reduced, and a good recording/reproduction characteristic was obtained.

Examples 2-8

Perpendicular magnetic recording media 10 according to Examples 2 to 8 were obtained following the same procedures as for the medium of Example 1, except that the material of a reaction barrier layer 5 was changed as shown in Table 2 below.

The obtained perpendicular magnetic recording media had a structure in which a nonmagnetic glass substrate 1/CrTi adhesive layer 2/CoFeTaZr soft magnetic underlayer 3/nonmagnetic seed layer 4/reaction barrier layer 5/nonmagnetic interlayer 6/CoCrPt—SiO$_2$ perpendicular magnetic recording layer 7/DLC protective layer 8 were stacked in this order.

The recording/reproduction characteristics of these media were evaluated in the same manner as in Example 1. As shown in Table 2, the media of this application according to Examples 1 to 8 had recording/reproduction characteristics better than those of the media of the comparative examples.

TABLE 2

| | Reaction barrier layer Material | SNR (dB) |
|---|---|---|
| Example 1 | Ag—5 at % C | 22.6 |
| Example 2 | Ag—5 mol % SiO$_2$ | 22.0 |
| Example 3 | Ag—5 at % Cu | 22.2 |
| Example 4 | Ag—5 at % Nd | 22.3 |
| Example 5 | Al—5 at % C | 21.9 |
| Example 6 | Al—5m mol % SiO$_2$ | 21.5 |
| Example 7 | Al—5 at % Cu | 21.6 |

Examples 9-12 & Comparative Examples 9-12

Perpendicular magnetic recording media 10 according to Examples 9 to 12 and Comparative Examples 9 to 12 were obtained following the same procedures as for the medium of Example 1, except that the C addition amount of the reaction barrier layer 5 was changed as shown in Table 3 below.

The obtained perpendicular magnetic recording media had a structure in which a nonmagnetic glass substrate 1/CrTi adhesive layer 2/CoFeTaZr soft magnetic underlayer 3/nonmagnetic seed layer 4/reaction barrier layer 5/nonmagnetic interlayer 6/CoCrPt—SiO$_2$ perpendicular magnetic recording layer 7/DLC protective layer 8 were stacked in this order.

First, cross-sectional TEM analysis was performed on these media. Consequently, in the media of Examples 1 and 9 to 12, the Ag grains in the AgGe nonmagnetic seed layer extended into the shape of a pillar in the direction perpendicular to the substrate, and epitaxially grew to the Ru grains in the nonmagnetic interlayer and the CoCrPt grains in the perpendicular magnetic recording layer via the AgC reaction barrier layer. That is, the Ag grains in the nonmagnetic seed layer, the Ru grains in the nonmagnetic interlayer, and the CoCrPt grains in the perpendicular magnetic recording layer grew by one-to-one growth. On the other hand, in the media of Comparative Examples 9 to 12, the structure of the AgC reaction barrier layer was observed as an amorphous structure, indicating that the one-to-one growth from the nonmagnetic seed layer to the Ru grains in the nonmagnetic interlayer was obstructed, so the traceability was insufficient. This was so probably because the addition amount of C was too large, so it was impossible to maintain the crystallinity of the Ag grains in the AgC reaction barrier layer, and the layer was amorphousized. Also, when plane-view TEM analysis was performed, the grain size distribution in the perpendicular magnetic recording layer was about 13% to 15%, i.e., improved in the media of Examples 1 and 9 to 12, but the grain size distribution in the perpendicular magnetic recording layer was about 22% to 25%, i.e., did not improve in the media of the comparative examples. Subsequently, the recording/reproduction characteristics were evaluated in the same manner as in Example 1. As shown in Table 3, the media of this application according to Examples 9 to 12 had recording/reproduction characteristics better than those of the media of the comparative examples.

TABLE 3

| | Reaction barrier layer Material | SNR (dB) |
|---|---|---|
| Example 9 | Ag—1 at % C | 22.8 |
| Example 10 | Ag—3 at % C | 22.7 |
| Example 1 | Ag—5 at % C | 22.6 |
| Example 11 | Ag—8 at % C | 21.5 |
| Example 12 | Ag—10 at % C | 21.3 |
| Comparative Example 9 | Ag—12 at % C | 19.5 |
| Comparative Example 10 | Ag—15 at % C | 18.2 |
| Comparative Example 11 | Ag—20 at % C | 15.9 |
| Comparative Example 12 | Ag | 19.0 |

Examples 13-16 & Comparative Examples 13-16

Perpendicular magnetic recording media 10 according to Examples 13 to 16 and Comparative Examples 13 to 16 were obtained following the same procedures as for the medium of Example 1, except that the material of a reaction barrier layer 5 was changed as shown in Table 4.

The obtained perpendicular magnetic recording media had a structure in which a nonmagnetic glass substrate 1/CrTi adhesive layer 2/CoFeTaZr soft magnetic underlayer 3/nonmagnetic seed layer 4/reaction barrier layer 5/nonmagnetic interlayer 6/CoCrPt—SiO$_2$ perpendicular magnetic recording layer 7/DLC protective layer 8 were stacked in this order.

First, cross-sectional TEM analysis was performed on these media. Consequently, in the media of Examples 5 and 13 to 16, the Ag grains in the AgGe nonmagnetic seed layer extended into the shape of a pillar in the direction perpendicular to the substrate, and epitaxially grew to the Ru grains in the nonmagnetic interlayer and the CoCrPt grains in the perpendicular magnetic recording layer via the AlC reaction barrier layer. That is, the Ag grains in the nonmagnetic seed layer, the Ru grains in the nonmagnetic interlayer, and the CoCrPt grains in the perpendicular magnetic recording layer grew by one-to-one growth. On the other hand, in the media of Comparative Examples 13 to 16, the structure of the AlC reaction barrier layer was observed as an amorphous structure, indicating that the one-to-one growth from the nonmagnetic seed layer to the Ru grains in the nonmagnetic interlayer was obstructed, so the traceability was insufficient. This was so perhaps because the addition amount of C was too large, so it was impossible to maintain the crystallinity of the Al grains in the AlC reaction barrier layer, and the layer was amorphousized. Also, when plane-view TEM analysis was performed, the grain size distribution in the perpendicular magnetic recording layer was about 13% to 15%, i.e., improved in the media of Examples 5 and 13 to 16, but the grain size distribution in the perpendicular magnetic recording layer was about 22% to 25%, i.e., did not improve in the media of the comparative examples. Subsequently, the recording/reproduction characteristics were evaluated in the same manner as in Example 1. As shown in Table 4, the media of this application according to Examples 13 to 16 had recording/reproduction characteristics better than those of the media of the comparative examples.

TABLE 4

|  | Reaction barrier layer Material | SNR (dB) |
|---|---|---|
| Example 13 | Al—1 at % C | 21.9 |
| Example 14 | Al—3 at % C | 21.9 |
| Example 5 | Al—5 at % C | 21.9 |
| Example 15 | Al—8 at % C | 21.3 |
| Example 16 | Al—10 at % C | 21.0 |
| Comparative Example 13 | Al—12 at % C | 18.2 |
| Comparative Example 14 | Al—15 at % C | 17.5 |
| Comparative Example 15 | Al—20 at % C | 14.3 |
| Comparative Example 16 | Al | 18.3 |

Examples 17-20 & Comparative Examples 17 & 18

Perpendicular magnetic recording media 10 according to Examples 17 to 20 of the present invention and Comparative Examples 17 and 18 were obtained following the same procedures as for the medium of Example 1, except that the thickness of a reaction barrier layer 5 was changed as shown in Table 5.

The obtained perpendicular magnetic recording media had a structure in which a nonmagnetic glass substrate 1/CrTi adhesive layer 2/CoFeTaZr soft magnetic underlayer 3/nonmagnetic seed layer 4/reaction barrier layer 5/nonmagnetic interlayer 6/CoCrPt—SiO$_2$ perpendicular magnetic recording layer 7/DLC protective layer 8 were stacked in this order.

The recording/reproduction characteristics of these media were evaluated in the same manner as in Example 1. As shown in Table 5, the media of this application according to Examples 17 to 20 had recording/reproduction characteristics better than those of the media of the comparative examples.

TABLE 5

|  | Reaction barrier layer Thickness (nm) | SNR (dB) |
|---|---|---|
| Example 17 | 0.1 | 22.1 |
| Example 18 | 0.3 | 22.4 |
| Example 19 | 0.5 | 22.5 |
| Example 1 | 1.0 | 22.6 |
| Example 20 | 2.0 | 21.4 |
| Comparative Example 17 | 3.0 | 19.6 |
| Comparative Example 18 | 5.0 | 19.3 |

TABLE 5-continued

|  | Reaction barrier layer Thickness (nm) | SNR (dB) |
|---|---|---|
| Comparative Example 1 | 0 | 19.2 |

Examples 21-23 & Comparative Examples 19-24

Perpendicular magnetic recording media 10 according to Examples 21 to 23 and Comparative Examples 19 to 24 were obtained following the same procedures as in Example 1, except that a nonmagnetic seed layer 4 was formed by using an Ag—Ge target in which the composition amount of Ge in the nonmagnetic seed layer was changed from 40 to 85 at %.

The obtained perpendicular magnetic recording media had a structure in which a nonmagnetic glass substrate 1/CrTi adhesive layer 2/CoFeTaZr soft magnetic underlayer 3/nonmagnetic seed layer 4/reaction barrier layer 5/nonmagnetic interlayer 6/CoCrPt—SiO$_2$ perpendicular magnetic recording layer 7/DLC protective layer 8 were stacked in this order.

Plane-view TEM analysis was performed on the nonmagnetic seed layers of these media. In the media of Examples 1 and 21 to 23, the AgGe film as the nonmagnetic seed layer contained crystalline Ag grains having a grain size of about 4 to 6 nm, and an amorphous Ge grain boundary having a grain boundary width of about 1 to 2 nm. The grain size distribution was about 13% to 15%, i.e., narrow grain size distribution. On the other hand, the nonmagnetic seed layers of the media of Comparative Examples 19 to 21 had a structure in which several Ag grains connected to each other. This was so perhaps because the amount of Ge as a grain boundary substance was too small, so it was impossible to sufficiently divide the Ag grains. Also, the AgGe nonmagnetic seed layers of the media of Comparative Examples 22 to 24 had an amorphous structure. This was so probably because the amount of Ge as a grain boundary substance was too large, so the grain structure was destroyed. The recording/reproduction characteristics of these media were evaluated in the same manner as in Example 1. As shown in Table 6 below, the media of this application according to Examples 21 to 23 had recording/reproduction characteristics better than those of the media of the comparative examples.

TABLE 6

|  | Nonmagnetic seed layer Material | SNR (dB) |
|---|---|---|
| Example 21 | Ag—55 at % Ge | 21.8 |
| Example 1 | Ag—60 at % Ge | 22.6 |
| Example 22 | Ag—65 at % Ge | 22.2 |
| Example 23 | Ag—70 at % Ge | 21.3 |
| Comparative Example 19 | Ag—40 at % Ge | 17.2 |
| Comparative Example 20 | Ag—45 at % Ge | 17.6 |
| Comparative Example 21 | Ag—50 at % Ge | 17.7 |
| Comparative Example 22 | Ag—75 at % Ge | 13.3 |
| Comparative Example 23 | Ag—80 at % Ge | 12.9 |
| Comparative Example 24 | Ag—85 at % Ge | 12.6 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A perpendicular magnetic recording medium comprising:
   a nonmagnetic substrate;
   a soft magnetic underlayer formed on the nonmagnetic substrate;
   a nonmagnetic seed layer formed on the soft magnetic underlayer, and containing silver grains having an fcc structure and an amorphous germanium grain boundary formed between the silver grains;
   a reaction barrier layer directly formed on the nonmagnetic seed layer, having a thickness of not more than 2 nm, and consisting of silver grains, and a grain boundary consisting of one or more additives selected from the group consisting of carbon, silicon dioxide, copper and neodymium, in which a composition ratio of the silver grains is not less than 90 at % and less than 100 at %, a composition ratio of the grain boundary is more than 0 at % and not more than 10 at %, and a total composition ratio of the silver grains and the grain boundary is 100 at %;
   a nonmagnetic interlayer directly formed on the reaction barrier layer, and made of a material selected from the group consisting of ruthenium and ruthenium alloys; and
   a perpendicular magnetic recording layer formed on the nonmagnetic interlayer.

2. The medium according to claim 1, wherein the one or more additives are at least one of copper and neodymium.

3. The medium according to claim 1, wherein the nonmagnetic seed layer consists of silver grains having an fcc structure and an amorphous germanium grain boundary formed between the silver grains.

4. The medium according to claim 1, wherein the reaction barrier layer contains 90 to 99 at % of silver.

5. A magnetic recording/reproduction apparatus comprising:
   a perpendicular magnetic recording medium including
   a nonmagnetic substrate,
   a soft magnetic underlayer formed on the nonmagnetic substrate,
   a nonmagnetic seed layer formed on the soft magnetic underlayer, and containing silver grains having an fcc structure and an amorphous germanium grain boundary formed between the silver grains,
   a reaction barrier layer directly formed on the nonmagnetic seed layer, having a thickness of not more than 2 nm, and consisting of silver grains, and a grain boundary consisting of one or more additives selected from the group consisting of carbon, silicon dioxide, copper and neodymium, in which a composition ratio of the silver grains is not less than 90 at % and less than 100 at %, a composition ratio of the grain boundary is more than 0 at % and not more than 10 at %, and a total composition ratio of the silver grains and the grain boundary is 100 at %,
   a nonmagnetic interlayer directly formed on the reaction barrier layer, and made of a material selected from the group consisting of ruthenium and ruthenium alloys, and
   a perpendicular magnetic recording layer formed on the nonmagnetic interlayer;
   a mechanism configured to support and rotate the perpendicular magnetic recording medium;
   a magnetic head including an element configured to record information on the perpendicular magnetic recording medium, and an element configured to reproduce recorded information; and
   a carriage assembly configured to support the magnetic head such that the magnetic head freely moves with respect to the perpendicular magnetic recording medium.

6. The apparatus according to claim 5, wherein the one or more additives are at least one of copper and neodymium.

7. The apparatus according to claim 5, wherein the nonmagnetic seed layer consists of silver grains having an fcc structure and an amorphous germanium grain boundary formed between the silver grains.

8. The apparatus according to claim 5, wherein the reaction barrier layer contains 90 to 99 at % of silver.

9. A perpendicular magnetic recording medium comprising:
   a nonmagnetic substrate;
   a soft magnetic underlayer formed on the nonmagnetic substrate;
   a nonmagnetic seed layer formed on the soft magnetic underlayer, and containing silver grains having an fcc structure and an amorphous germanium grain boundary formed between the silver grains;
   a reaction barrier layer directly formed on the nonmagnetic seed layer, having a thickness of not more than 2 nm, and consisting of silver grains, and a grain boundary comprising one or more additives selected from the group consisting of carbon, silicon dioxide, copper and neodymium, in which a composition ratio of the silver grains is not less than 90 at % and less than 100 at %, a composition ratio of the grain boundary is more than 0 at % and not more than 10 at %, and a total composition ratio of the silver grains and the grain boundary is 100 at %;
   a nonmagnetic interlayer directly formed on the reaction barrier layer, and made of a material selected from the group consisting of ruthenium and ruthenium alloys; and
   a perpendicular magnetic recording layer formed on the nonmagnetic interlayer.

10. The medium according to claim 9, wherein the one or more additives are at least one of copper and neodymium.

11. The medium according to claim 9, wherein the nonmagnetic seed layer consists of silver grains having an fcc structure and an amorphous germanium grain boundary formed between the silver grains.

12. The medium according to claim 9, wherein the reaction barrier layer contains 90 to 99 at % of silver.

* * * * *